United States Patent
Wang et al.

(10) Patent No.: US 12,417,171 B2
(45) Date of Patent: Sep. 16, 2025

(54) METHOD FOR COPYING DATA QUICKLY, COMPUTER DEVICE AND NON-TRANSITORY COMPUTER-READABLE STORAGE MEDIUM BY COPYING L2P VALUE FROM SOURCE LPA TO TARGET LPA

(71) Applicant: SUZHOU UNIONMEMORY INFORMATION SYSTEM LIMITED, Jiangsu (CN)

(72) Inventors: Meng Wang, Jiangsu (CN); Weihua Xu, Jiangsu (CN); Jian Li, Jiangsu (CN); Daojing Han, Jiangsu (CN)

(73) Assignee: SUZHOU UNIONMEMORY INFORMATION SYSTEM LIMITED, Jiangsu (CN)

( * ) Notice: Subject to any disclaimer, the term of this patent is extended or adjusted under 35 U.S.C. 154(b) by 0 days.

(21) Appl. No.: 18/249,602

(22) PCT Filed: Oct. 26, 2022

(86) PCT No.: PCT/CN2022/127727
§ 371 (c)(1),
(2) Date: Apr. 19, 2023

(87) PCT Pub. No.: WO2023/221403
PCT Pub. Date: Nov. 23, 2023

(65) Prior Publication Data
US 2025/0181494 A1 Jun. 5, 2025

(30) Foreign Application Priority Data
May 18, 2022 (CN) .......................... 202210547804.8

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ......... G06F 12/0246; G06F 2212/7201; G06F 3/065
See application file for complete search history.

(56) References Cited

U.S. PATENT DOCUMENTS

| 2015/0347026 A1* | 12/2015 | Thomas ............... G06F 3/0611 711/103 |
| 2019/0146913 A1* | 5/2019 | Trika .................. G06F 12/0246 711/103 |
| 2021/0223979 A1 | 7/2021 | Li et al. |

FOREIGN PATENT DOCUMENTS

| CN | 104360956 A | 2/2015 |
| CN | 107391391 A | 11/2017 |

* cited by examiner

*Primary Examiner* — Chie Yew
(74) *Attorney, Agent, or Firm* — Brooks Kushman P.C.

(57) ABSTRACT

A method for copying data quickly, includes: obtaining, by a host computer, a logical address of a target data to be copied and a logical address of a source data; sending, by the host computer, a data copying command to a SSD; converting, by the SSD, the logical address range of the target data and the logical address range of the source data into a LPA range of the target data and a LPA range of the source data; sequentially copies, by the SSD, L2P values corresponding to the LPA range of the source data to L2P values corresponding to the LPA range of target data; incrementing, by the SSD, a reference count of a physical address corresponding to the LPA range of the source data to indicate that the data has been copied; and transmitting a signal indicating that the data has been copied to the host computer.

9 Claims, 8 Drawing Sheets

METHOD FOR COPYING DATA QUICKLY, COMPUTER DEVICE AND NON-TRANSITORY COMPUTER-READABLE STORAGE MEDIUM BY COPYING L2P VALUE FROM SOURCE LPA TO TARGET LPA

CROSS-REFERENCE TO RELATED APPLICATIONS

This application is a 35 U.S.C. § 371 national stage application of PCT patent application No. PCT/CN2022/127727, filed on Oct. 26, 2022, which claims priority to Chinese patent application No. 202210547804.8, filed on May 18, 2022, and entitled "method and apparatus for copying data quickly, computer device and storage medium". The entire contents of which are incorporated herein by reference.

TECHNICAL FIELD

The present application relates to the technical field of data copying of solid state disk, and more particularly, refers to a method for copying data quickly, a computer device and a non-transitory computer-readable storage medium.

BACKGROUND

Solid state disk (Solid State Disk, SSD) has been widely used in various occasions, and the SSD has gradually replaced the traditional hard disk drive (Hard Disk Drive, HDD) in the personal computer (Personal Computer, PC) market currently, and provides better experience for users in reliability and performance. The interior of the SSD uses NAND as a medium for data storage. Due to characteristics of NAND, NAND cannot be directly and repeatedly written after it is written, and NAND can only be written after erasing. A host computer generally access the SSD based on a logical block address (Logical Block Address, LBA). In order to accurately track a storage location of the host computer in the physical NAND, a logical-to-physical address mapping table (Logical-to-Physical Address Mapping Table, L2P table) needs to be maintained inside the SSD. When data is written, a physical storage address is allocated to the logical address data written by the host computer, and the corresponding L2P table is updated. When data is read, a physical address corresponding to the logical address in the L2P table is queried according to the logical address. Then, the data is read and transmitted to the host computer.

In the SSD of the related art, when the host computer copies a file, file data needs to be read out from the SSD to the host computer sequentially, and then written into a new logical address (i.e., a target address). In this process, data needs to be read from and written into the NAND for multiple times, and data needs to be transmitted through a system bus for multiple times, so that the performance of data copying of the SSD is greatly restricted.

SUMMARY

An objective of the present application is providing a method for quickly copying data, an apparatus for quickly copying data, a computer device and a computer-readable storage medium, thereby overcoming the deficiency in the related art.

In order to solve the technical problem mentioned above, the technical solutions adopted in the present application are described below:

In the first aspect, a method for quickly copying data is provided, the method includes following steps of
obtaining, by a host computer, a logical address of a target data to be copied and a logical address of a source data;
sending, by the host computer, a data copying command to a solid state drive (SSD); the data copying command includes a logical address range of the target data and a logical address range of the source data;
converting, by the SSD, the logical address range of the target data and the logical address range of the source data into a logical page address (LPA) range of the target data and a LPA range of the source data;
sequentially copies, by the SSD, L2P values corresponding to the LPA range of the source data to L2P values corresponding to the LPA range of the target data;
incrementing, by the SSD, a reference count of a physical address corresponding to the LPA range of the source data to indicate that the data has been copied; and
transmitting, by the SSD, a signal indicating that the data has been copied to the host computer.
a further technical solution of the present application is that, the method for quickly copying data further includes:
obtaining, by a host computer, an instruction of deleting a file generated by clicking by a user;
by the host computer, issuing a TRIM command and describing a logical block address (LBA) range of the deleted file to the SSD;
converting LBAs to LPAs by the SSD;
traversing the LPAs, looking up a logical-to-physical address mapping table (L2P table) according to a value of a LPA to obtain a value of a physical address GPPA corresponding to the LPA, and modifying a table entry of the L2P table into a no-map value by the SSD;
by the SSD, looking up a Gppa_Reference_Count table according to the value of the physical address GPPA, and decrementing a table entry value of the Gppa_Reference_Count table corresponding to the physical address GPPA;
determining whether the table entry value of the Gppa_Reference_Count table corresponding to the physical address GPPA is decremented to 0; and
recycling the physical address corresponding to the LPA by the SSD, if the table entry value of the Gppa_Reference_Count table corresponding to the physical address GPPA value is decremented to 0;
determining whether processing of all the LPAs have been completed;
transmitting, by the SSD, a signal indicating that all the LPAs have been processed to the host computer, if all the LPAs have been processed.

A further technical solution of the present application is that, after the step of determining whether the table entry value of the Gppa_Reference_Count table corresponding to the physical address GPPA is decremented to 0, the method further includes: skipping to perform the step of determining whether all the LPAs have been processed, if the table entry value of the Gppa_Reference_Count table corresponding to the physical address GPPA is not decremented to 0.

A further technical solution of the present application is that, after the step of determining whether all the LPAs have been processed, the method further includes: skipping to perform the step of traversing the LPAs, looking up the L2P table according to the value of the LPA to obtain the value of the physical address GPPA corresponding to the LPA, and modifying the table entry of the L2P table into the no-map value by the SSD, if not all of the LPAs have been processed.

In the second aspect, an apparatus for copying data quickly is provided in the embodiments of the present application. The apparatus includes: a first acquisition unit, a transmission unit, a first conversion unit, a copying unit, an increment unit, and a first delivery unit;

the first acquisition unit is configured to acquire a logical address of a target data to be copied and a logical address of a source data through a host computer;

a transmission unit is configured to transmit a data copying command to a solid state drive (SSD) through the host computer; the data copying command comprises a logical address range of the target data and a logical address range of the source data;

the first conversion unit is configured to convert the logical address range of the target data and the logical address range of the source data into a logical page address (LPA) range of the target data and a LPA range of the source data through the SSD;

the copying unit is configured to sequentially copy L2P values corresponding to the LPA range of the source data to L2P values corresponding to the LPA range of target data through the SSD;

the increment unit is configured to increment a reference count of a physical address corresponding to the LPA range of the source data to indicate that the data has been copied through the SSD;

the first delivery unit is configured to deliver a signal indicating that the data has been copied to the host computer through the SSD.

In the second aspect, a computer device is provided in the embodiments of the present application. The computer device includes a memory and a processor, the memory stores a computer program, that, when being executed by the processor, causes the processor to perform the aforesaid method for quickly copying data.

In the third aspect, a non-transitory computer-readable storage medium is provided in the embodiments of the present application. The computer-readable storage medium stores a computer program, the computer program includes a program instruction, that, when being executed by a processor of a computer device, causes the processor of the computer device to implement the method for copying data quickly.

Compared with the related art, the present application has the following beneficial effects: by incrementing the reference count of the physical address, copying of the actual data is replaced with copying of a mapping table, and a real read-write operation does not need to be performed on the user data, so that the time spent on copying data is greatly reduced, the performance data copying of the SSD is improved, and the requirement of the user can be better met.

The present application is further described below with reference to the accompanying drawings and the embodiments.

DESCRIPTION OF THE DRAWINGS

In order to describe the technical solutions in the embodiments of the present application more clearly, a brief introduction regarding the accompanying drawings needed to be used for describing the embodiments or the existing technologies is given below. It is obvious that, the accompanying drawings described below are only some embodiments of the present application. A person of ordinary skill in the art may also obtain other drawings according to the current drawings without paying creative efforts.

DETAILED DESCRIPTION OF EMBODIMENTS

In order to make the ordinarily skilled one in the art to understand the technical solutions of the present application better, the technical solutions in the embodiments of the present application will be described in detail below with reference to the accompanying drawings in the embodiments of the present application. It is apparent that, the embodiments described below are merely some embodiments of the present application, rather than all of the embodiments. Based on the embodiments in the present application, other embodiments, which are obtained by the person of ordinary skill in the art at without paying creative labor, should all be included in the protection scope of the present application.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms used in the description of the present application are only for the purpose of describing embodiments, rather than being intended to limit the present application. As is used in the description and the annexed claims of the present application, unless other conditions are indicated clearly in the context, otherwise, singular forms of terms such as "a", "one", "the" are intended to include plural forms.

It should be further understood that, terms "and/or" used in the description and the annexed claims of the present application are referred to as any combination of one or a plurality of listed item(s) associated with each other and all possible items, and including these combinations.

Figure 1:
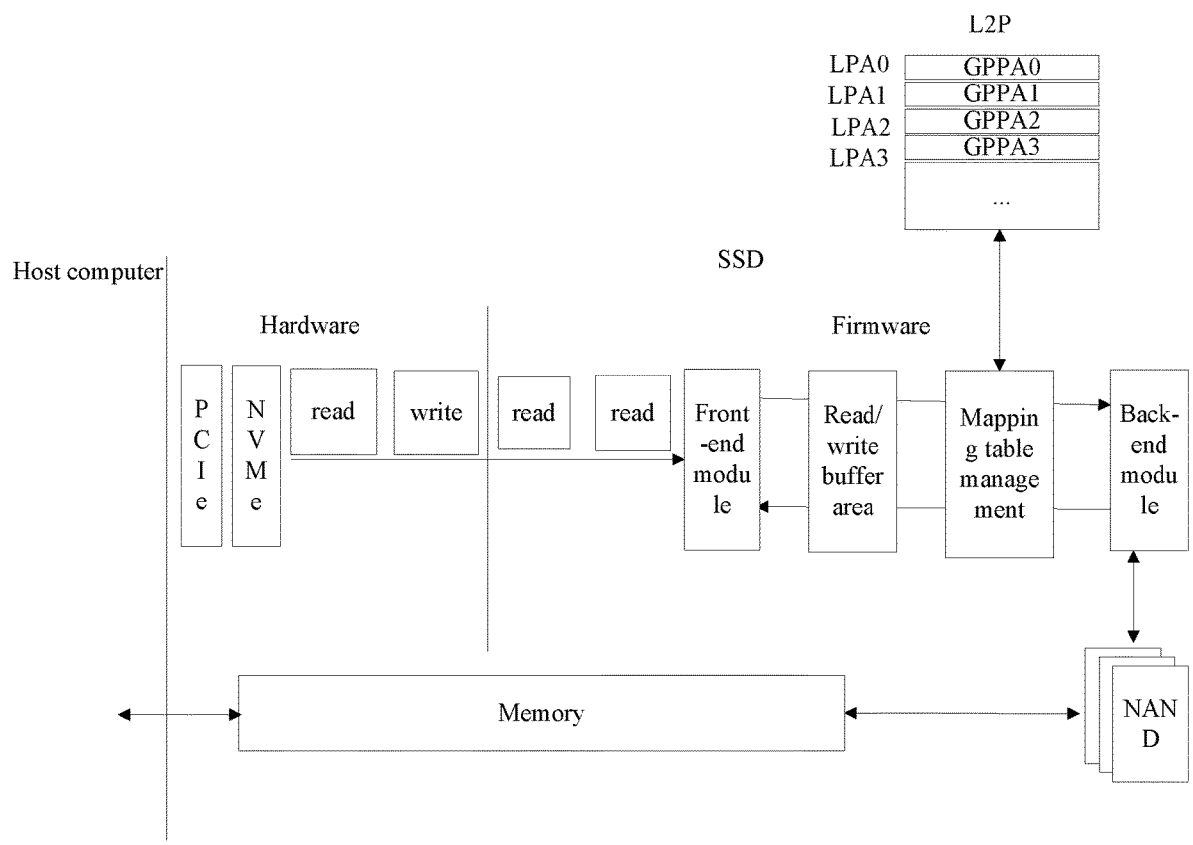
FIG. 1 illustrates a schematic diagram of a typical reading-writing scenario of a SSD.

Referring to a typical reading and writing scenario of a solid state drive (Solid State Drive, SSD) shown in FIG. 1.

A host computer sends a command to a SSD hardware module;

After receiving the command, the SSD hardware module retransmits the command to a firmware module to be processed.

A SSD firmware front-end module divides the command into a plurality of mapping units (LPA, which typically occupies 4 kilobytes of memory space);

An operation request is submitted to a buffer management module, and a read-write buffer area is allocated;

If the command is a write command, a data transmission between the SSD and the host computer is established according to the allocated buffer area, and the host computer is informed that the command has been executed after data transmission is completed;

If the command is a read command, the operation request is submitted to a mapping table management module;

The mapping table management module is responsible for allocating a corresponding physical address (write command) according to the logical address or converting the logical address into a Not And (NAND) physical address (read command);

the operation request is submitted to a backend module, the backend module initiates a NAND read/write request according to the physical address;

completion of the NAND read/write operation request is waited;

if the command is the read command, when data is ready, a transmission of the data from NAND cache register (NAND Cache Register) to the host computer is initiated.

Figure 2:
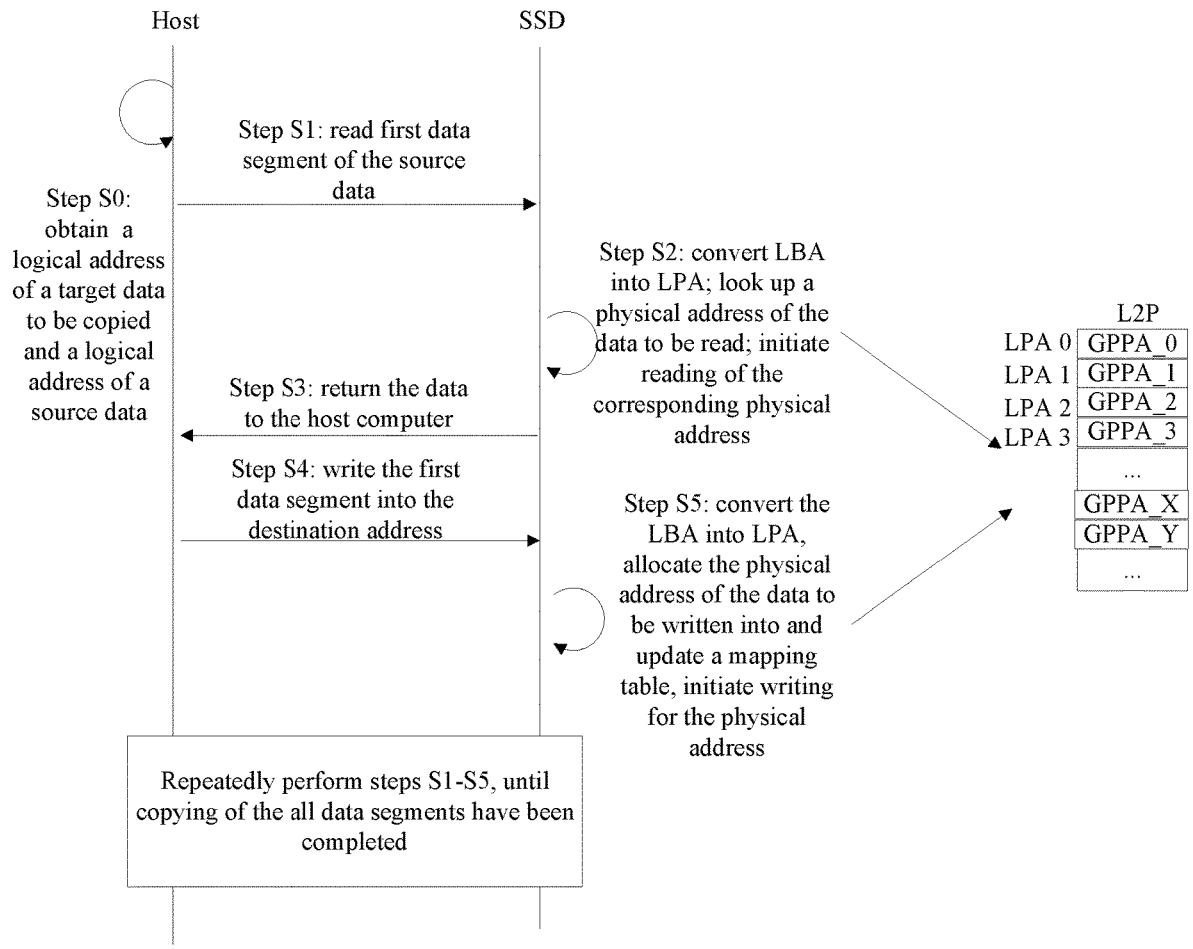
FIG. 2 illustrates a schematic diagram of an existing host computer file copy scenario.

FIG. 2 illustrates a schematic diagram of a scenario of copying file by the host computer file in the prior art shown in FIG. 2. The scenario of copying file by the host computer file in the prior art includes:

In step 1, a logical address of a source data to be copied and a logical address of a target data are obtained;

In step 2, a host computer reads a first data segment of the source data;

In step 3, a SSD converts a logical block address (Logical Block Address, LBA) into a logical page address (Logical Page Addresses, LPA), looks up a physical address of the data to be read and initiates a reading operation of the corresponding physical address;

In step 4, the SSD returns data to the host computer.

In step 5, the host computer writes the first data segment into a target address.

In step 6, the LBA is converted into the LPA; a physical address of the data to be written is allocated and a mapping table is updated. A write operation on the corresponding physical address is initiated;

In step 7, steps 1-5 are repeatedly performed until the replication of all data segments is completed.

In the aforesaid process, the source data needs to be read out from the SSD/NAND in sequence, and is transmitted to the memory of the host computer through a bus (e.g., peripheral component interconnect express, PCIe), and then is transmitted to the SSD through the bus (i.e., PCIe), and then is written into the NAND, the involved operations are plural, so that the performance of data copying of the SSD is greatly restricted.

Figure 3:
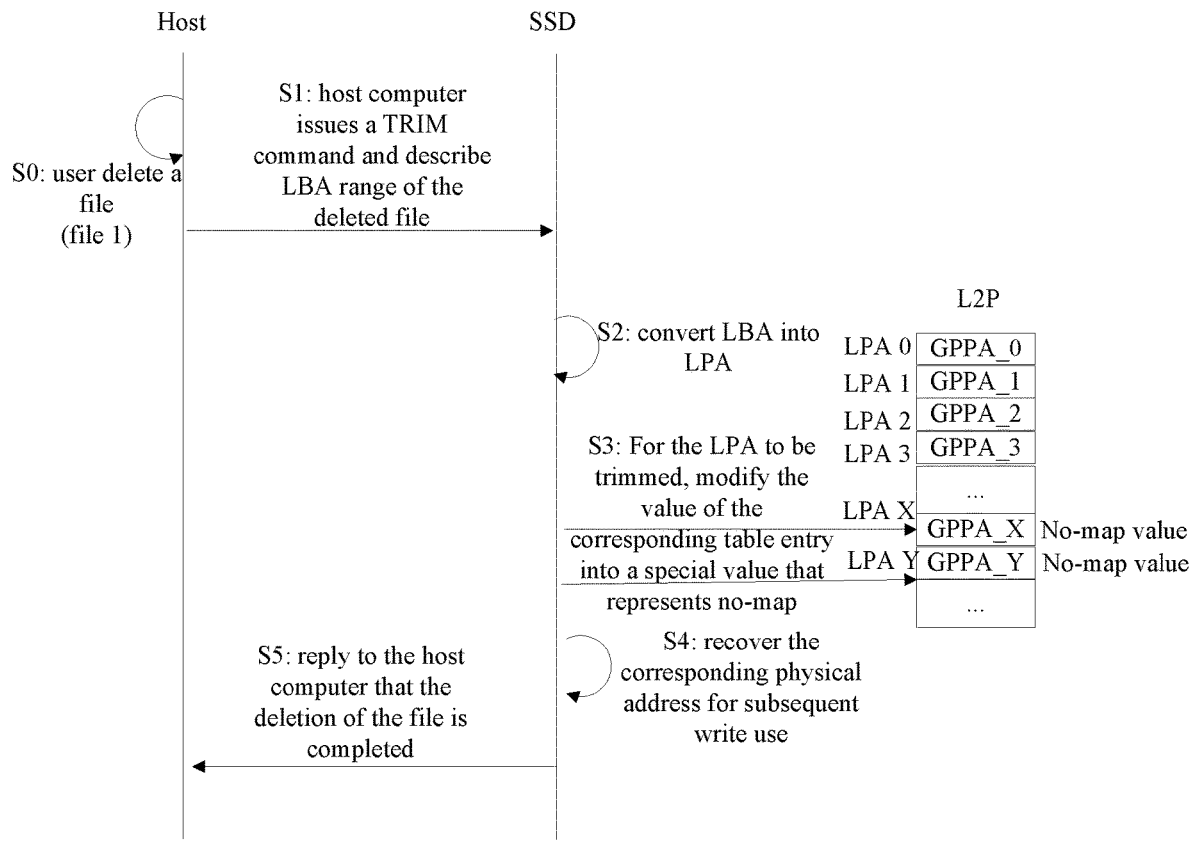
FIG. 3 illustrates a schematic diagram of an existing host computer file delete scenario.

FIG. 3 illustrates a schematic diagram of a scenario of deleting file by the host computer shown in FIG. 3. The scenario of deleting file by the host computer includes:

A user deletes the file (taking the deletion of the file 1 as an example).

A host computer issues a TRIM command, and describes the LBA interval of the deleted file (file 1-data area 1, file 2-data 2);

The SSD converts a logical block address (Logical Block Address, LBA) into a logical page address (Logical Page Address, LPA) (e.g., LBA 0-7 corresponds to LPA 0; LBA 8-15 corresponds to LPA 1, and the like);

Regarding the LPA to be trimmed (e.g., LPA X/Y in FIG. 3), a value in a corresponding table entry is corrected as a special value (the special value is defined by the SSD, and is such as 0xFFFFFFFF), which represents an invalid data (no-map);

The corresponding physical address (e.g., GPPA X/Y in the FIG. 3) is recovered for subsequent use of writing.

A reply of completion is sent to the host computer.

In the existing SSD, one single physical address may only be referenced by one unique logical address. Thus, when the host computer deletes the file (i.e., the logical address corresponding to the TRIM), it indicates that the corresponding physical address corresponding to the logical address is released and may be directly recovered.

Figure 4:
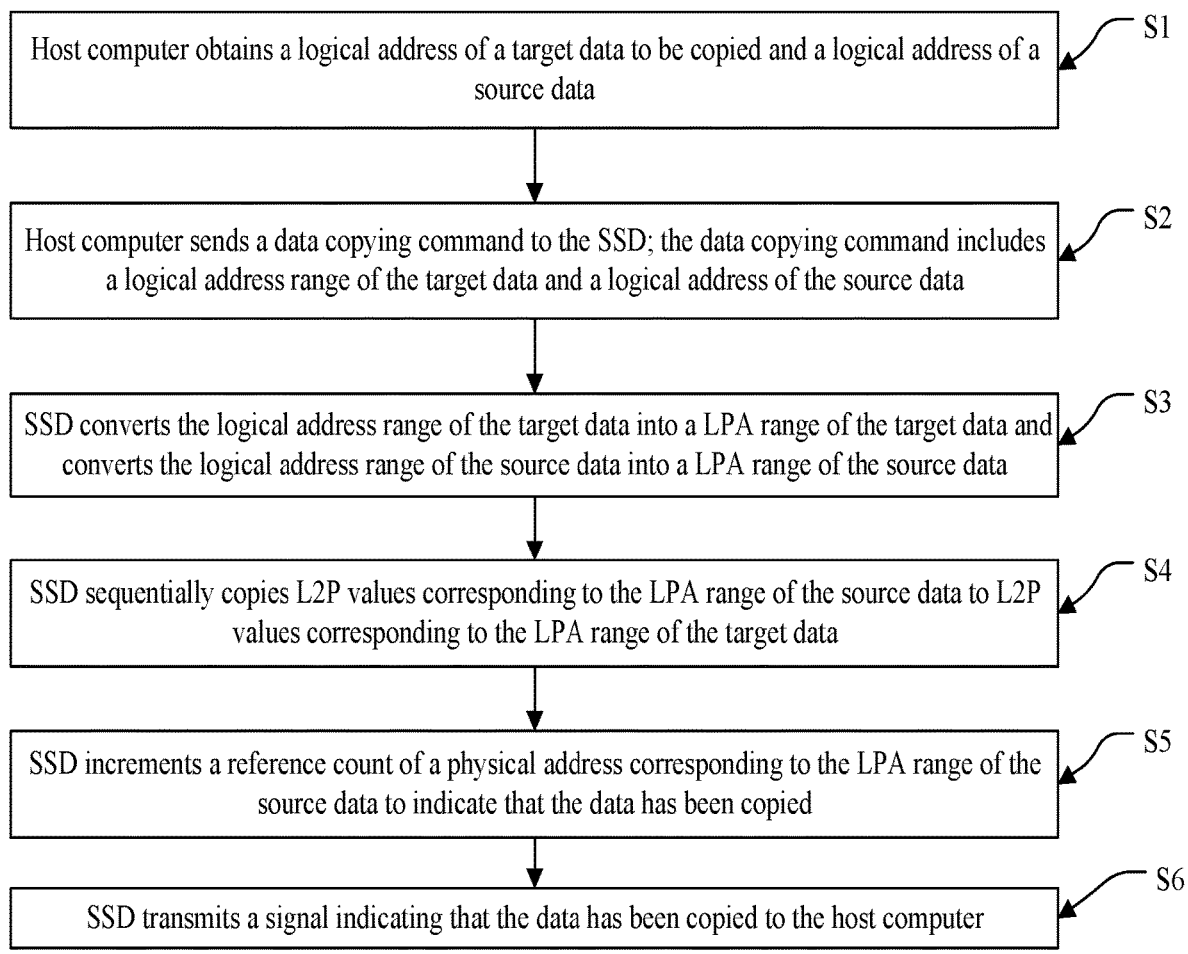
FIG. 4 illustrates a first schematic flow diagram of a method for copying data quickly in accordance with one embodiment of the present application.

Referring to the embodiment shown in FIG. 4, the present application discloses a method for copying data quickly, the method includes the following steps:

In a step of S1, a host computer obtains a logical address of a target data to be copied and a logical address of a source data;

In a step of S2, the host computer sends a data copying command to the SSD; the data copying command includes a logical address range of the target data and a logical address of the source data.

In a step of S3, the SSD converts the logical address range of the target data into a logical page address (Logical Page Address, LPA) range of the target data and converts the logical address range of the source data into a LPA range of the source data.

In a step of S4, the SSD sequentially copies L2P values corresponding to the LPA range of the source data to L2P values corresponding to the LPA range of the target data.

In a step of S5, the SSD increments a reference count of a physical address corresponding to the LPA range of the source data to indicate that the data has been copied.

In a step of S6, the SSD transmits a signal indicating that the data has been copied to the host computer.

Figure 7:
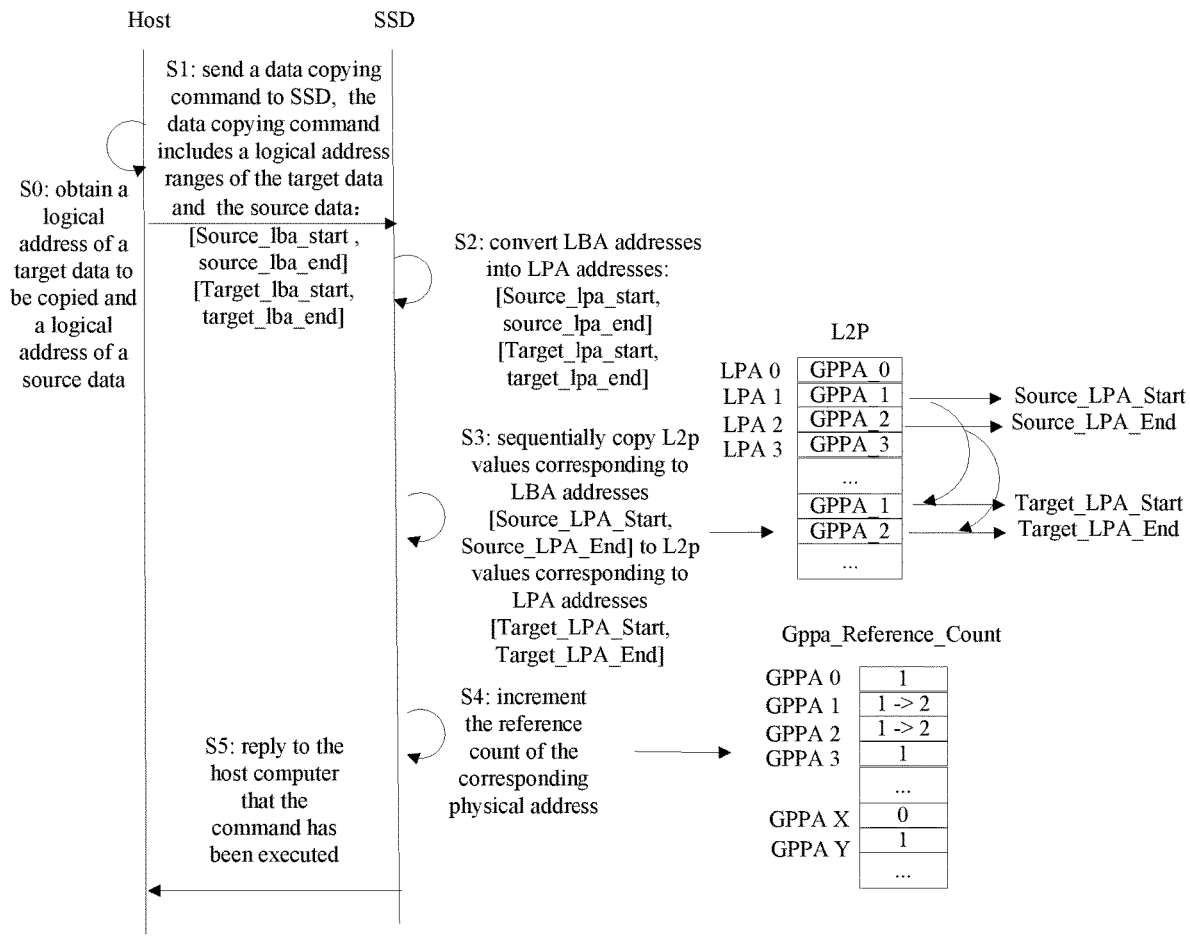
FIG. 7 illustrates a schematic diagram of an application scenario of the method for copying data quickly in accordance with one embodiment of the present application.

Referring to the embodiment shown in FIG. 7, the host computer obtains the logical address of the target data to be copied and the logical address of the source data, then, the host computer sends the data copying command to the SSD. The data copying command includes the logical address range of the target data and the logical address range of the source data; the logical address range of the source data is represented as [Source_Lba_Start, Source_Lba_End], and the logical address range of the target data is [Target_Lba_Start, Target_Lba_End]. The SSD converts the logical address range of the target data into the LPA range of the target data and converts the logical address range of the source data into the LPA range of the source data. For example: (Lba0-7 corresponds to LPA0, Lba8-15 corresponds to LPA1, etc.): [Source_Lpa_Start, Source_Lpa_End], [Target_Lpa_Start, Target_Lpa_End]. The SSD sequentially copies the L2P values corresponding to the LPA range of the source data to the L2P values corresponding to LPA range of the target data. For example, the L2P values corresponding to [Source_Lpa_Start, Source_Lpa_End] are copied to the L2P values corresponding to [Target_Lpa_Start, Target_Lpa_End]. The SSD increments the reference count of the physical address corresponding to the LPA range of the source data, which indicates that the data has been copied. For example, a reference count of a physical address gppa 1/2 in the FIG. 7 is incremented from 1 to 2, which indicates that the two logical addresses have referenced the physical address gppa 1/2 respectively. Then, the SSD transmits the signal indicating that the data has been copied to the host computer.

According to the method for copying data in accordance with the present application, when data copying is only performed in the SSD, data reading/data transmission/data writing are not performed, instead, the table in the memory is copied and modified merely, so that the performance of the SSD is greatly improved.

Figure 5:
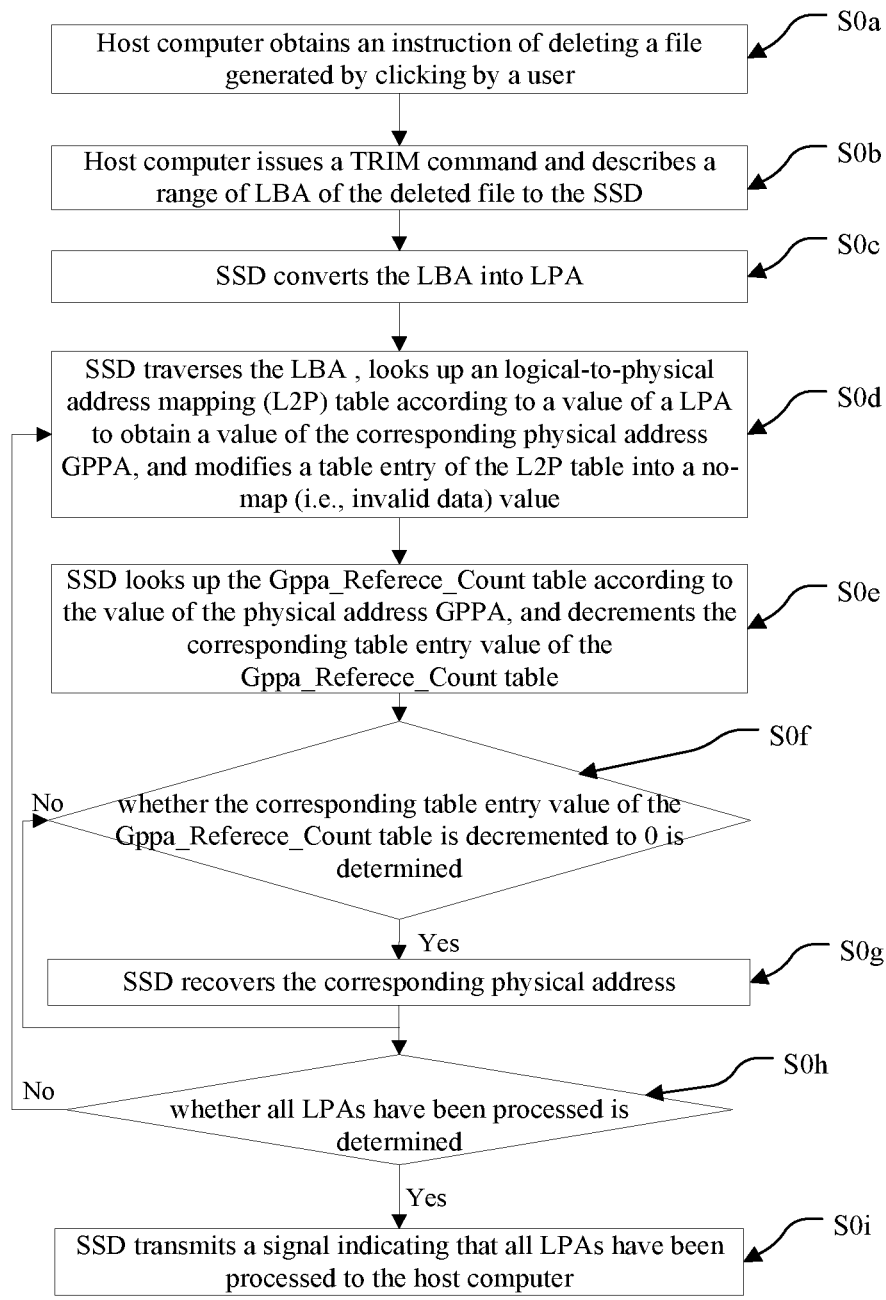
FIG. 5 illustrates a second schematic flow diagram of the method for copying data quickly in accordance with one embodiment of the present application.

Referring to the embodiment shown in FIG. 5, the method for copying data quickly further includes:

In a step of S0*a*, the host computer obtains an instruction of deleting a file generated by clicking by a user.

Figure 6:
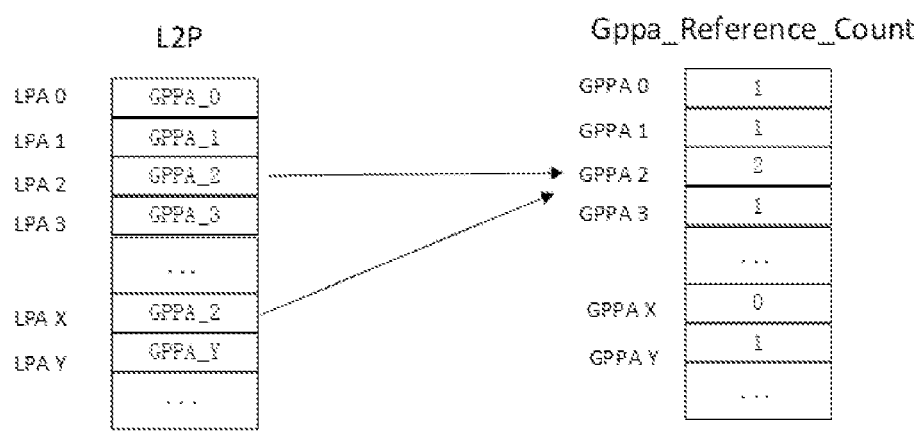
FIG. 6 illustrates a schematic diagram of a structure of a Gppa_Reference_Count table in accordance with one embodiment of the present application.

Referring to the structure of the Gppa_Reference_Count table shown in FIG. 6, an internal management table of the SSD is introduced in the method for copying data quickly of the present application. Gppa_Reference_Count table is added.

The Gppa_Reference_Count table is indexed to internal physical addresses GPPA of the SSD, which are sequentially Gppa 0, Gppa 1, Gppa 2, etc. The value of each of the physical addresses GPPA is an integer which indicates the number of the logical addresses which have referenced the physical address. As shown in FIG. 6, both logical page address (Logical Page Address, LPA) 2 and logical page address (Logical Page Address, LPA) X have referenced the physical address Gppa 2, which means that, a value of a table entry corresponding to the physical address Gppa 2 is 2, which indicates that data contents of LPA 2 and LPA X are the same as the data stored in the physical address Gppa 2.

In a step of S0*b*, the host computer issues a TRIM command and provides a range of logical block addresses (Logical Block Addresses, LBAs) of the deleted file to the SSD.

In a step of S0*c*, the SSD converts the LBAs into logical page addresses (Logical Page Addresses, LPAs).

In a step of S0*d*, the SSD traverses the LBAs, looks up a logical-to-physical address mapping (L2P) table according to a value of a LPA to obtain a value of the corresponding physical address GPPA, and modifies a table entry of the L2P table into a no-map (i.e., invalid data) value.

In a step of S0*e*, the SSD looks up the Gppa_Referece-_Count table according to the value of the physical address GPPA, and decrements the corresponding table entry value of the Gppa_Referece_Count table.

In a step of S0*f*, whether the table entry value of the corresponding Gppa_Referece_Count table is decremented to 0 is determined. If the table entry value of the corresponding Gppa_Referece_Count table is not decremented to 0, skipping to perform the step S0*h*;

In a step of S0*g*, the SSD recycles the corresponding physical address, if the table entry value of the Gppa_Referece_Count table is decremented to 0.

In a step of S0*h*, whether all LPAs have been processed is determined. If all the LPAs are not processed, skipping to perform the step S0*d*.

In a step of S0*i*, the SSD transmits a signal indicating that all LPAs have been processed to the host computer, if all the LPAs have been processed.

According to the present application, by adding the reference count of the physical address, copying of the actual data is replaced with copying of the mapping table, there is no need to perform real read-write operation on the user data, so that time spent on copying is greatly saved, the performance of data copying is improved, and the requirement of the user can be better satisfied.

Figure 8:
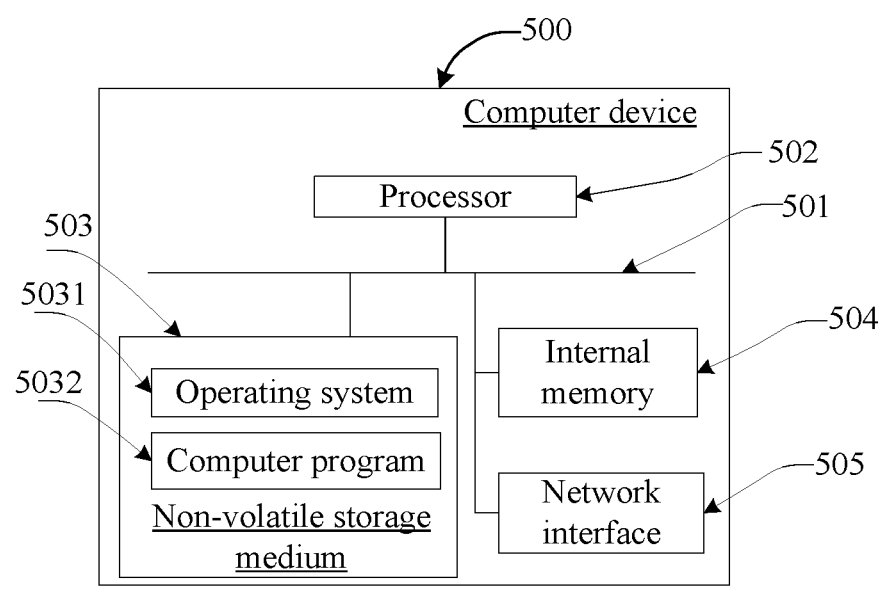
FIG. 8 illustrates a schematic block diagram of a computer device in accordance with one embodiment of the present application.

Referring to FIG. 8, FIG. 8 illustrates a schematic block diagram of a computer device according to one embodiment of the present application. The computer device 500 may be a terminal device or be a server, and the terminal device may be an electronic device having a communication function, such as a smartphone, a tablet computer, a notebook computer, a desktop computer, a personal digital assistant (Personal Digital Assistant, PDA), and a wearable device. The server may be an independent server, or be a server cluster composed of a plurality of servers.

Referring to FIG. 8, the computer device 500 includes a processor 502, a memory, and a network interface 505 which are connected through a system bus 501. The memory may include a non-volatile storage medium 503 and an internal memory 504.

The non-volatile storage medium 503 may store an operating system 5031 and a computer program 5032. The computer program 5032 includes a program instruction, that, when being executed by a processor 502, causes the processor 502 to perform the method for copying data quickly in the method embodiments.

The processor 502 is configured to provide computing and control capabilities to support the operation of the entire computer device 500.

The internal memory 504 provides an environment for the operation of the computer program 5032 in the non-volatile storage medium 503. When the computer program 5032 is executed by the processor 502, the processor 502 is caused to perform the method for copying data quickly in the method embodiments.

The network interface 505 is configured to perform network communication with other devices. A person of ordinary skill in the art may understand that the structure shown in FIG. 8 is merely a block diagram of a part of the structure of the computer device 500 related to the technical solutions of the present application, and is not constituted as limitation to the technical solutions of the computer device 500 of the present application. The specific computer device 500 may include more or less components than those components shown in the figure. As an alternative, the computer device 500 may integrate some components, or have different component arrangement.

In some embodiments, the processor 502 is configured to execute the computer program 5032 stored in the memory to implement the following steps:

In a step of S1, a host computer obtains a logical address of a target data to be copied and a logical address of a source data;

In a step of S2, the host computer sends a data copying command to the SSD; the data copying command includes a logical address range of the target data and a logical address of the source data.

In a step of S3, the SSD converts logical address range of the target data and logical page address (Logical Page Address, LPA) range of the target data and converts the logical address range of the source data into a LPA range of the source data.

In a step of S4, the SSD sequentially copies L2P values corresponding to the LPA range of the source data to L2P values corresponding to the LPA range of the target data.

In a step of S5, the SSD increments a reference count of a physical address corresponding to the LPA range of the source data to indicate that the data has been copied.

In a step of S6, the SSD transmits a signal indicating that the data has been copied to the host computer.

It should be understood that, in the embodiments of the present application, the processor 502 may be central processing unit (Central Processing Unit, CPU), and may also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor, as an alternative, the processor can also be any conventional processor, or the like.

The person of ordinary skill in the art may understand that, a whole or part of flow process for implementing the method in the embodiments of the present application may also be accomplished by using a computer program to instruct relevant hardware. The computer program includes a program instruction, and is stored in a storage medium. The storage medium is a non-transitory computer-readable storage medium. The program instruction is executed by at least one processor in a computer system to implement the steps in the method embodiments.

Thus, a storage medium is further provided in the present application. The storage medium is a non-transitory computer-readable storage medium. The storage medium stores the computer program, where, the computer program includes the program instruction, that, when executed by the processor, implement the method for copying data quickly. The storage medium stores a computer program, the computer program includes the program instruction, that, when being executed by the processor, implement the method for copying data quickly. The program instruction includes following steps:

In a step of S1, a host computer obtains a logical address of a target data to be copied and a logical address of a source data;

In a step of S2, the host computer sends a data copying command to the SSD; the data copying command includes a logical address range of the target data and a logical address of the source data.

In a step of S3, the SSD converts logical address range of the target data and logical page address (Logical Page Address, LPA) range of the target data and converts the logical address range of the source data into a LPA range of the source data.

In a step of S4, the SSD sequentially copies L2P values corresponding to the LPA range of the source data to L2P values corresponding to the LPA range of the target data.

In a step of S5, the SSD increments a reference count of a physical address corresponding to the LPA range of the source data to indicate that the data has been copied.

In a step of S6, the SSD transmits a signal indicating that the data has been copied to the host computer.

The storage medium may be one of various computer-readable storage mediums that can store program codes, such as a USB flash disk, a mobile hard disk drive (Hard Disk Drive, HDD), a read-only memory (Read-Only Memory, ROM), a magnetic disk, or an optical disc.

The aforesaid embodiments are some preferable implementations of the present application. In addition, the present application may be implemented in other manners. Any obvious replacement made without departing from the concept of the technical solutions of the present application is included in the protection scope of the present application.

What is claimed is:

1. A method for quickly copying data, comprising following steps of:

obtaining, by a host computer, a logical address of a target data to be copied and a logical address of a source data;

sending, by the host computer, a data copying command to a solid state drive (SSD), wherein the data copying command comprises a logical address range of the target data and a logical address range of the source data;

converting, by the SSD, the logical address range of the target data and the logical address range of the source data into a logical page address (LPA) range of the target data and a LPA range of the source data;

sequentially copies, by the SSD, L2P values corresponding to the LPA range of the source data to L2P values corresponding to the LPA range of the target data;

incrementing, by the SSD, a reference count of a physical address corresponding to the LPA range of the source data to indicate that the data has been copied; and transmitting, by the SSD, a signal indicating that the data has been copied to the host computer.

2. The method according to claim 1, further comprising:

obtaining, by a host computer, an instruction of deleting a file generated by clicking by a user;

by the host computer, issuing a TRIM command and describing a logical block address (LBA) range of the deleted file to the SSD;

converting LBAs to LPAs by the SSD;

traversing the LPAs, looking up a logical-to-physical address mapping table (L2P table) according to a value of a LPA to obtain a value of a physical address GPPA corresponding to the LPA, and modifying a table entry of the L2P table into a no-map value by the SSD;

by the SSD, looking up a Gppa_Reference_Count table according to the value of the physical address GPPA, and decrementing a table entry value of the Gppa_Reference_Count table corresponding to the physical address GPPA;

determining whether the table entry value of the Gppa_Reference_Count table corresponding to the physical address GPPA is decremented to 0; and recycling the physical address corresponding to the LPA by the SSD, in response to determining that the table entry value of the Gppa_Reference_Count table corresponding to the physical address GPPA value is decremented to 0;

determining whether processing of all the LPAs have been completed;

transmitting, by the SSD, a signal indicating that all the LPAs have been processed to the host computer, in response to determining that all the LPAs have been processed.

3. The method according to claim 2, wherein after determining whether a second table entry value of the Gppa_Reference_Count table corresponding to a second physical address GPPA is decremented to 0, the method further comprises:

skipping to perform determining whether all second LPAs of a second TRIM command have been processed, in response to determining that the second table entry value of the GppaReference_Count table corresponding to the second physical address GPPA is not decremented to 0.

4. The method according to claim 2, wherein after the step of determining whether all the LPAs have been processed, the method further comprises: skipping to perform the step of traversing the LPAs, looking up the L2P table according to the value of the LPA to obtain the value of the physical address GPPA corresponding to the LPA, and modifying the table entry of the L2P table into the no-map value by the SSD, in response to determining that all of the LPAs have been processed.

5. A computer device, comprising a memory and a processor, wherein the memory stores a computer program, that, when being executed by the processor, causes the processor to perform steps of a method for quickly copying data, comprising:
  obtaining, by a host computer, a logical address of a target data to be copied and a logical address of a source data;
  sending, by the host computer, a data copying command to a solid state drive (SSD), wherein the data copying command comprises a logical address range of the target data and a logical address range of the source data;
  converting, by the SSD, the logical address range of the target data and the logical address range of the source data into a logical page address (LPA) range of the target data and a LPA range of the source data;
  sequentially copies, by the SSD, L2P values corresponding to the LPA range of the source data to L2P values corresponding to the LPA range of the target data;
  incrementing, by the SSD, a reference count of a physical address corresponding to the LPA range of the source data to indicate that the data has been copied; and
  transmitting, by the SSD, a signal indicating that the data has been copied to the host computer.

6. A non-transitory computer-readable storage medium which stores a computer program, the computer program includes a program instruction, that, when being executed by a processor, causes the processor to implement operations of a method for quickly copying data, the operations comprising:
  obtaining, by a host computer, a logical address of a target data to be copied and a logical address of a source data;
  sending, by the host computer, a data copying command to a solid state drive (SSD), wherein the data copying command comprises a logical address range of the target data and a logical address range of the source data;
  converting, by the SSD, the logical address range of the target data and the logical address range of the source data into a logical page address (LPA) range of the target data and a LPA range of the source data;
  sequentially copies, by the SSD, L2P values corresponding to the LPA range of the source data to L2P values corresponding to the LPA range of the target data;
  incrementing, by the SSD, a reference count of a physical address corresponding to the LPA range of the source data to indicate that the data has been copied; and
  transmitting, by the SSD, a signal indicating that the data has been copied to the host computer.

7. The computer device according to claim 5, wherein the processor is further caused to perform steps of:
  obtaining, by a host computer, an instruction of deleting a file generated by clicking by a user;
  by the host computer, issuing a TRIM command and describing a logical block address (LBA) range of the deleted file to the SSD;
  converting LBAs to LPAs by the SSD;
  traversing the LPAs, looking up a logical-to-physical address mapping table (L2P table) according to a value of a LPA to obtain a value of a physical address GPPA corresponding to the LPA, and modifying a table entry of the L2P table into a no-map value by the SSD;
  by the SSD, looking up a Gppa_Reference_Count table according to the value of the physical address GPPA, and decrementing a table entry value of the Gppa_Reference_Count table corresponding to the physical address GPPA;
  determining whether the table entry value of the Gppa_Reference_Count table corresponding to the physical address GPPA is decremented to 0; and
  recycling the physical address corresponding to the LPA by the SSD, if the table entry value of the Gppa_Reference_Count table corresponding to the physical address GPPA value is decremented to 0;
  determining whether processing of all the LPAs have been completed;
  transmitting, by the SSD, a signal indicating that all the LPAs have been processed to the host computer, if all the LPAs have been processed.

8. The computer device according to claim 7, wherein after the step of determining whether the table entry value of the Gppa_Reference_Count table corresponding to the physical address GPPA is decremented to 0, the processor is further caused to perform a step of:
  skipping to perform the step of determining whether all the LPAs have been processed, if the table entry value of the Gppa_Reference_Count table corresponding to the physical address GPPA is not decremented to 0.

9. The computer device according to claim 7, wherein after the step of determining whether all the LPAs have been processed, the processor is further caused to perform a step of skipping to perform the step of traversing the LPAs, looking up the L2P table according to the value of the LPA to obtain the value of the physical address GPPA corresponding to the LPA, and modifying the table entry of the L2P table into the no-map value by the SSD, if not all of the LPAs have been processed.

* * * * *